US011073709B2

(12) United States Patent
Ko et al.

(10) Patent No.: US 11,073,709 B2
(45) Date of Patent: Jul. 27, 2021

(54) LCOS DISPLAY WITH LIGHT ABSORBING MATERIAL BETWEEN PIXELS

(71) Applicant: OmniVision Technologies, Inc., Santa Clara, CA (US)

(72) Inventors: Pei-Wen Ko, Taipei (TW); Chun-Sheng Fan, Zhudong Township (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/164,469

(22) Filed: Oct. 18, 2018

(65) Prior Publication Data
US 2020/0124902 A1   Apr. 23, 2020

(51) Int. Cl.
*G02F 1/1333* (2006.01)
*G02F 1/1362* (2006.01)
*G02F 1/1335* (2006.01)
*G02F 1/1343* (2006.01)
*G02F 1/135* (2006.01)

(52) U.S. Cl.
CPC ...... *G02F 1/133308* (2013.01); *G02F 1/1343* (2013.01); *G02F 1/133553* (2013.01); *G02F 1/136209* (2013.01); *G02F 1/136277* (2013.01); *G02F 1/1352* (2021.01); *G02F 1/133314* (2021.01); *G02F 1/133337* (2021.01)

(58) Field of Classification Search
CPC combination set(s) only.
See application file for complete search history.

(56) References Cited

U.S. PATENT DOCUMENTS

| 6,476,890 | B1* | 11/2002 | Funahata | G02F 1/133512 349/110 |
| 6,731,366 | B1* | 5/2004 | Goang | G02F 1/13394 349/155 |
| 2005/0140838 | A1* | 6/2005 | Oh | G02F 1/133555 349/42 |
| 2006/0192915 | A1* | 8/2006 | Kimura | G02F 1/13452 349/151 |
| 2007/0013839 | A1* | 1/2007 | Rho | G02F 1/133345 349/114 |
| 2013/0201429 | A1* | 8/2013 | Xu | G02F 1/133514 349/95 |
| 2016/0282666 | A1* | 9/2016 | Ro | G02F 1/13454 |

* cited by examiner

*Primary Examiner* — Lauren Nguyen
(74) *Attorney, Agent, or Firm* — Larry E Henneman, Jr.; Henneman & Associates, PLC (57) ABSTRACT

An example liquid crystal display device includes a circuit substrate, an array of conductive mirrors formed on the substrate, a light absorbing material disposed between the conductive mirrors, a transparent plate disposed over the array of conductive mirrors, and liquid crystal material disposed between the conductive mirrors and the transparent plate. The light absorbing material can also be disposed around the peripheral region of the array of the conductive mirrors. In an example display, the light absorbing material is black and/or has a light absorbing efficiency of at least fifty percent.

22 Claims, 8 Drawing Sheets

LCOS DISPLAY WITH LIGHT ABSORBING MATERIAL BETWEEN PIXELS

BACKGROUND

Field of the Invention

This invention relates generally to liquid crystal displays, and more particularly to liquid crystal on silicon (LCOS) displays.

Description of the Background Art

Currently there is a demand for display devices in various commercial and consumer applications. For example, LCoS image display devices are being incorporated into many different mobile and automotive devices.

Figure 1:
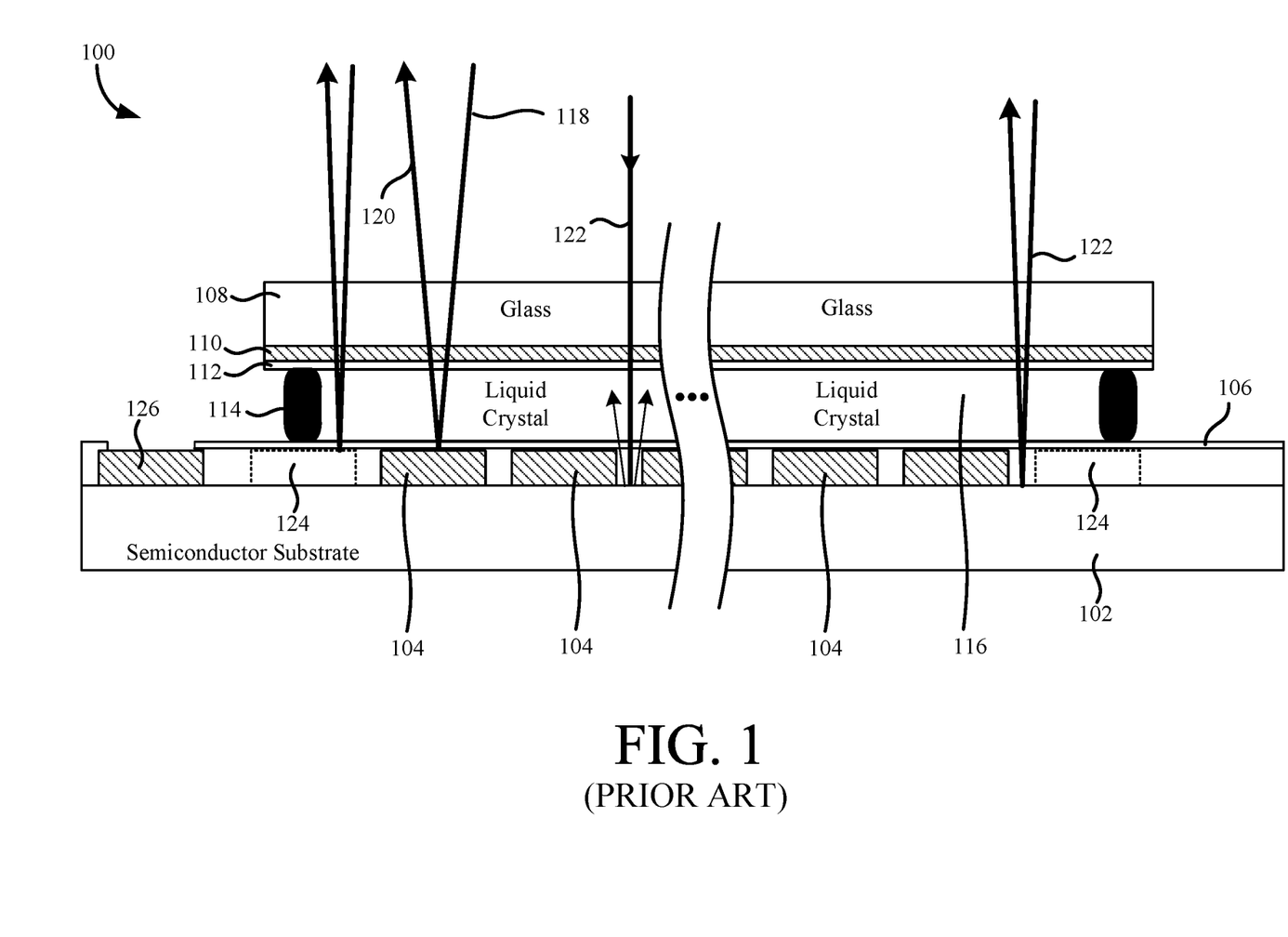
FIG. 1 shows a cross-sectional side view of a prior art LCOS display.

FIG. 1 shows a cross-sectional side view of a prior art LCOS image display 100, which includes a semiconductor substrate 102, an array of pixel mirrors 104, a first alignment layer 106, a cover glass 108, a transparent electrode 110, a second alignment layer 112, a gasket 114, and a liquid crystal layer 116. Display 100 is driven at least in part by the image processing and control circuitry (not shown) of substrate 102. Pixel mirrors 104 are reflective and conductive metal elements formed on substrate 102 to reflect impinging light 118. Furthermore, mirrors 104 are electrically connected to the circuitry (not shown) of substrate 102 such that each individual one of mirrors 104 can be selectively charged. Alignment layer 106 is formed over mirrors 104 and facilitates the alignment of liquid crystal layer 108. Glass 108 is a transparent plate through which reflected, modulated light is transmitted. Transparent electrode 110 is formed directly on glass 108 from, for example, Indium Tin Oxide to provide a common electrode. Alignment layer 112 is formed on the bottom surface of glass 108, over transparent electrode 110, to facilitate the alignment of liquid crystal layer 116. Gasket 114 is a liquid-tight seal disposed between alignment layers 106 and 112 to seal liquid crystal layer 116 therebetween.

Incident light 118 is polarized in a first predetermined polarization state and enters through the top surface of glass 108, passes through layers 110, 112, 116, and 106, is reflected off pixel mirrors 104, and then passes again through the layers 106, 116, 112, 110, and 108, before exiting display device 100. The polarization of the light is altered by liquid crystal layer 116, depending on the electrical field applied across the liquid crystal layer 116. When transparent electrode 110 is held at a particular voltage, the electrical field across liquid crystal layer 116 is controlled by the voltages asserted on mirrors 104. Thus, the polarization of the incident light is spatially modulated according to image signals asserted on mirrors 104, and the light is output as a spatially modulated beam 120. The modulated beam 120 is then analyzed by an analyzer having a predetermined polarization state to produce a displayable image. The intensity of light displayed for each pixel thus depends on the polarization imparted by the liquid crystal, responsive to a particular signal asserted on each mirror 104.

Image display 100 further includes a plurality of dummy pixels 124 and electrical contacts 126. Dummy pixels 124 are non-active pixels formed around the peripheral active pixels of the array of pixels 104. Dummy pixels 124 are formed on substrate 102 during the forming of active pixels 104 to provide a uniform surface that is co-planar with pixels 104. Contacts 126, which are also formed during the formation of pixels 104, provide a means to electrically connect display 100 to hosting circuitry (e.g. complimentary contacts of a PCB) by some suitable means such as, for example, wire-bonds.

There are some problems associated with prior art LCOS image display 100. For example, some of the light 122 entering into display 100 impinges on the irregular areas between pixel mirrors 104, and adjacent to the array of active pixels 104, and is reflected at unpredictable angles. This stray light causes interference and reduces the overall image quality of display 100.

Figure 2:
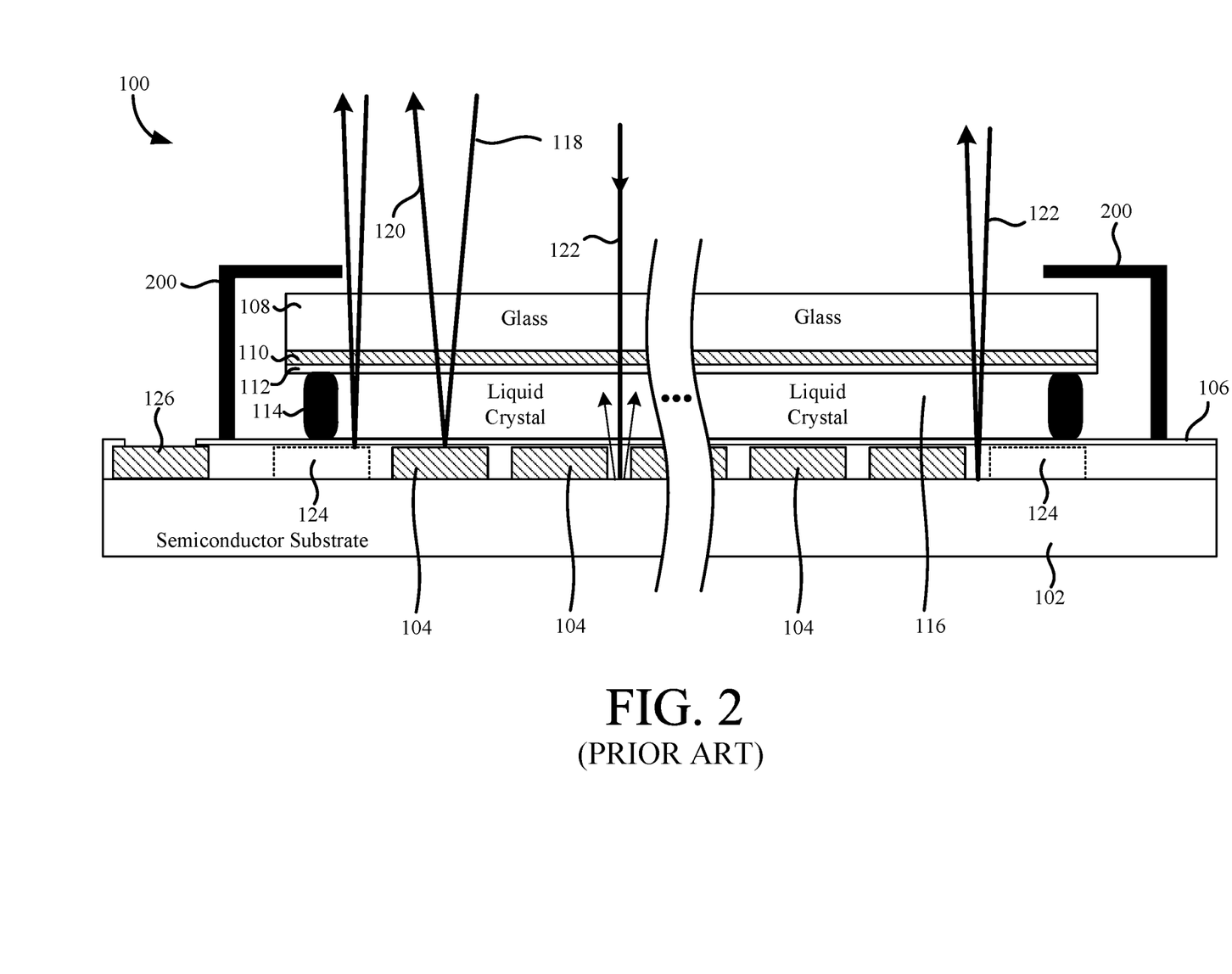
FIG. 2 shows a cross-sectional side view of the prior art LCOS display of FIG. 1, including an opaque cover.

There have been various attempts to mitigate the problems associated with stray light interference. For example, FIG. 2 shows a cross-sectional side view of image display 100 further including a opaque plastic cover 200 for preventing unwanted stray light from entering/exiting the peripheral areas of display 100. Although cover 200 helps prevent unwanted light from entering through the peripheral areas of glass 108, there are disadvantages. One disadvantage is that cover 202 must be precisely mounted over display 100 with a very strict tolerance to prevent any of mirrors 104 from being covered and to prevent the peripheral areas of substrate 102 from being exposed.

Figure 3:
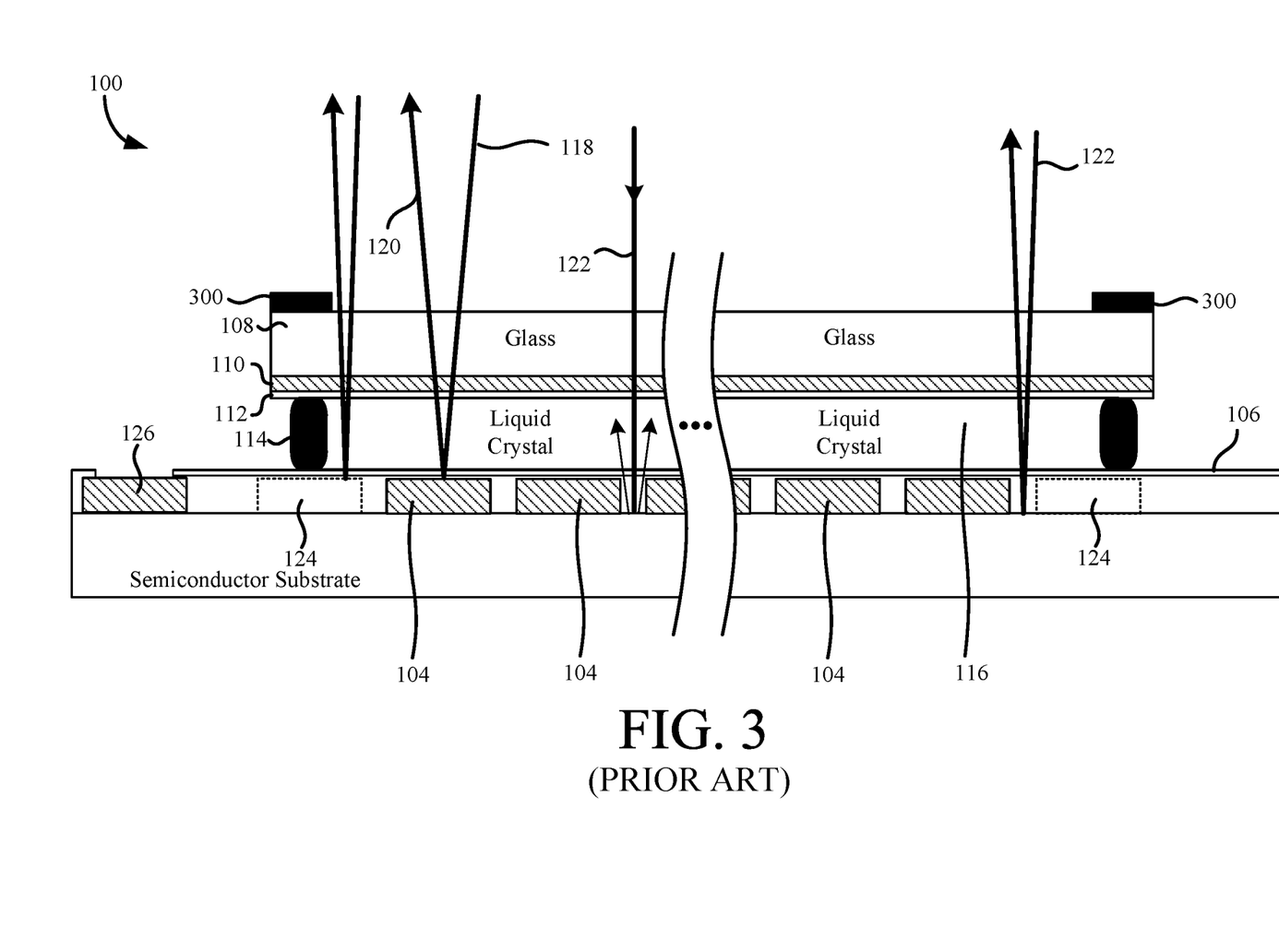
FIG. 3 shows a cross-sectional side view of the prior art LCOS display of FIG. 2, including an opaque layer.

In another attempt to mitigate the problems associated with stray light interference, some prior art displays apply opaque layers directly to the glass. For example, FIG. 3 shows a cross-sectional side view of image display 100 further including an opaque layer 300 deposited directly on the top surface of glass 108. Like cover 200, opaque layer 300 is positioned over the peripheral area of the array of mirrors 104. Also like cover 200, cover 300 must be applied with a great deal of precision to avoid covering any of mirrors 104.

Although cover 200 and layer 300 helps prevent unwanted light from impinging on the area surrounding the array of pixels 104, they do not prevent light from impinging on, and reflecting off, the areas between mirrors 104. Furthermore, the application of cover 200 and layer 300 both require expensive and time consuming processes, which require greater precision than is usually available at this stage of assembly.

What is needed, therefore, is an LCoS display device capable of displaying higher quality images. What is also needed is an LCoS display device that is less expensive, less time consuming, and requires less precision to manufacture.

SUMMARY

The present invention overcomes the problems associated with the prior art by providing a reflective display backplane and/or a liquid crystal display device including a light absorbing material deposited between and/or around (framing) pixel mirrors of the device. The invention provides a reduction in light scattering within the display device and, therefore, improved display performance.

An example liquid crystal display device includes a circuit substrate, an array of conductive mirrors formed on the substrate, a light absorbing material disposed between the conductive mirrors, a transparent plate disposed over the array of conductive mirrors, and liquid crystal material disposed between the conductive mirrors and the transparent plate. The light absorbing material can also be disposed around the peripheral region of the array of the conductive mirrors. In an example display, the light absorbing material is black and/or has a light absorbing efficiency of at least fifty percent.

Optionally, the light absorbing material is formed on the circuit substrate by a lithographic process. In one example, the light absorbing material is formed directly on a surface the circuit substrate, the conductive mirrors are formed directly on the surface of the circuit substrate, and the light absorbing material and the array of the conductive mirrors are coplanar.

An example liquid crystal display device further includes a plurality of electrical wire bond pads formed on the circuit substrate, and the plurality of wire bond pads and the array of the conductive mirrors are coplanar and formed from the same material. Optionally, the light absorbing material covers the entire top surface of the circuit substrate, except for top surfaces of the pixel mirrors and the electrical bond pads.

The example liquid crystal display device is a Liquid Crystal on Silicon (LCOS) device. The liquid crystal display device includes a first liquid crystal alignment layer formed over the conductive mirrors and over the light absorbing material.

An example method for manufacturing a liquid crystal display device is also disclosed. The example method includes providing a reflective display backplane including an array of pixel mirrors formed thereon. The pixel mirrors of the array are spaced apart from one another and define gaps between adjacent ones of the pixel mirrors. The example method additionally includes providing a light absorbing material and depositing the light absorbing material between the conductive mirrors. The example method additionally includes incorporating the reflective display backplane, with the light absorbing material deposited thereon, into a liquid crystal display device. Optionally, the example method further includes depositing the light absorbing material around a perimeter of the array of the conductive pixel mirrors.

In an example method, the light absorbing material is black. The light absorbing material advantageously has a light absorbing efficiency of at least fifty percent.

The step of depositing the light absorbing material between the conductive mirrors can include forming a layer of the light absorbing material on the circuit substrate using a lithographic process. Optionally, the step of forming the layer of the light absorbing material includes forming the layer of the light absorbing material to be coplanar with top surfaces of the pixel mirrors. The step of depositing the light absorbing material between the pixel mirrors can include forming the light absorbing material directly on a surface of the reflective display backplane.

In a particular example method, the reflective display backplane further includes a plurality of electrical bond pads. The step of depositing the light absorbing material can include covering the entire top surface of the reflective display backplane with the light absorbing material, except for top surfaces of the pixel mirrors and the electrical bond pads.

In an example method, the liquid crystal display device is a Liquid Crystal on Silicon (LCOS) device. The example method further includes forming a first liquid crystal alignment layer over the pixel mirrors and the light absorbing material.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by applying a light absorbing material in the areas between the pixel mirrors and/or around the peripheral regions of the pixel mirror array of an LCoS device. The light absorbing material absorbs the light that would otherwise impinge on the regions of the pixel array that are not intended to reflect light, thus improving the overall image quality. In addition, the light absorbing material is applied using high precision processes similar to those used to manufacture the reflective display backplane (e.g., wafer level processes).

In the following description, numerous specific details are set forth (e.g., pixel mirror materials, particular display device structures, etc.) in order to provide a thorough understanding of the invention. Those skilled in the art will recognize, however, that the invention may be practiced apart from these specific details. In other instances, details of well-known liquid crystal display manufacturing practices (e.g., pixel array formation, semiconductor device formation, etc.) and components have been omitted, so as not to unnecessarily obscure the present invention.

Figure 4:
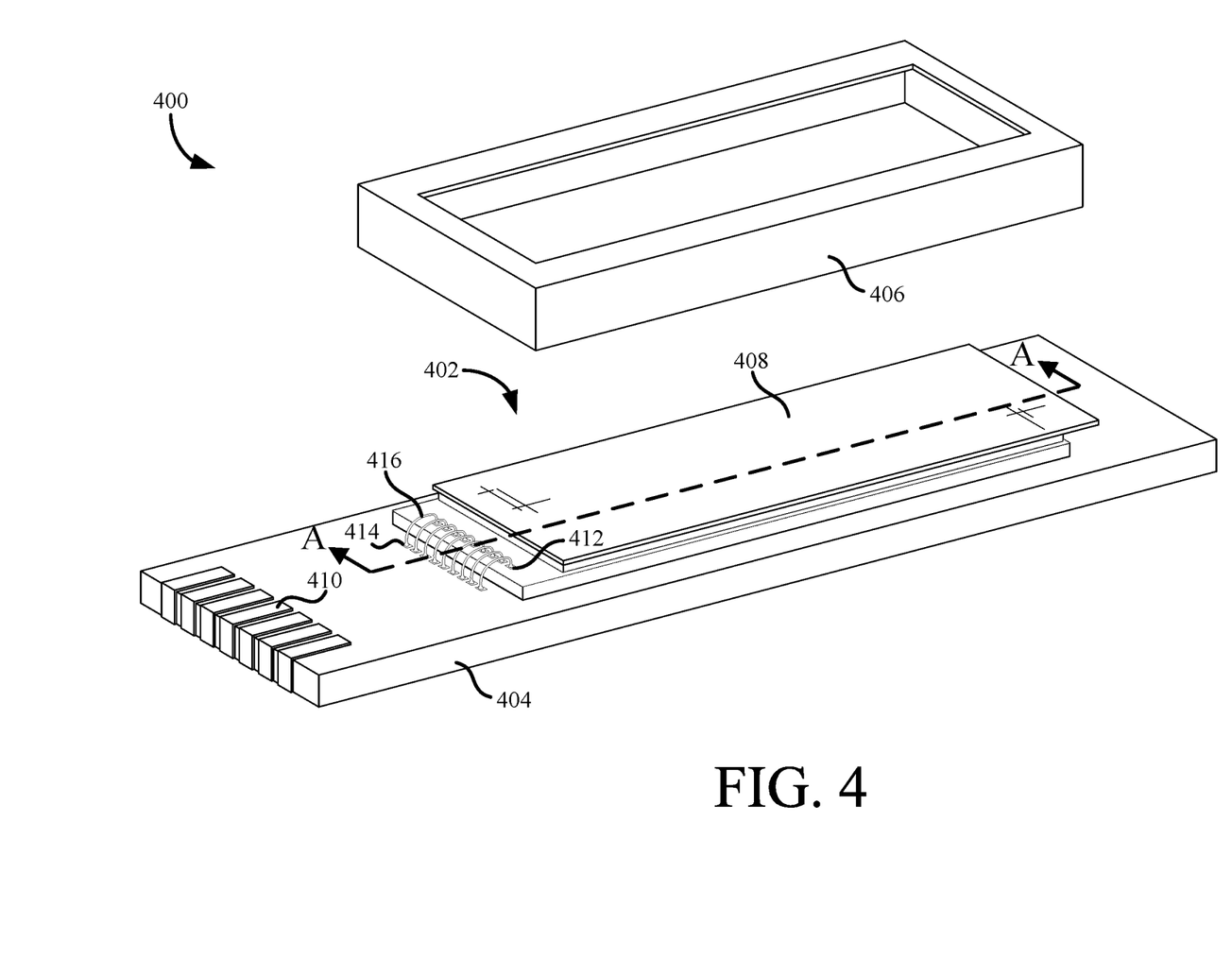
FIG. 4 is perspective view of an improved reflective LCOS device.

FIG. 4 shows a perspective view of an improved reflective LCoS device 400. Device 400 includes a display assembly 402, a printed circuit substrate (PCB) 404, and a light shield 406. Display assembly 402 includes a display surface 408 through which light enters, is modulated (i.e., polarized, filtered), and then exits as a modulated image beam. PCB 404 enables display assembly 402 to communicate with and be powered by a host device (not shown) via I/O terminals (pins) 410. Display assembly 402 is mounted on, and electrically connected to, PCB 404. As shown, display assembly 402 includes a set of bond pads 412 that are electrically connected to a complimentary set of bond pads 414 of PCB 404, via a respective set of bonded wires 416. Light shield 406 represents an opaque element (e.g., plastic housing, opaque mask formed on display surface 408, etc.) disposed over display surface 408 to prevent stray light from entering the peripheral region of display surface 408.

Figure 5A:
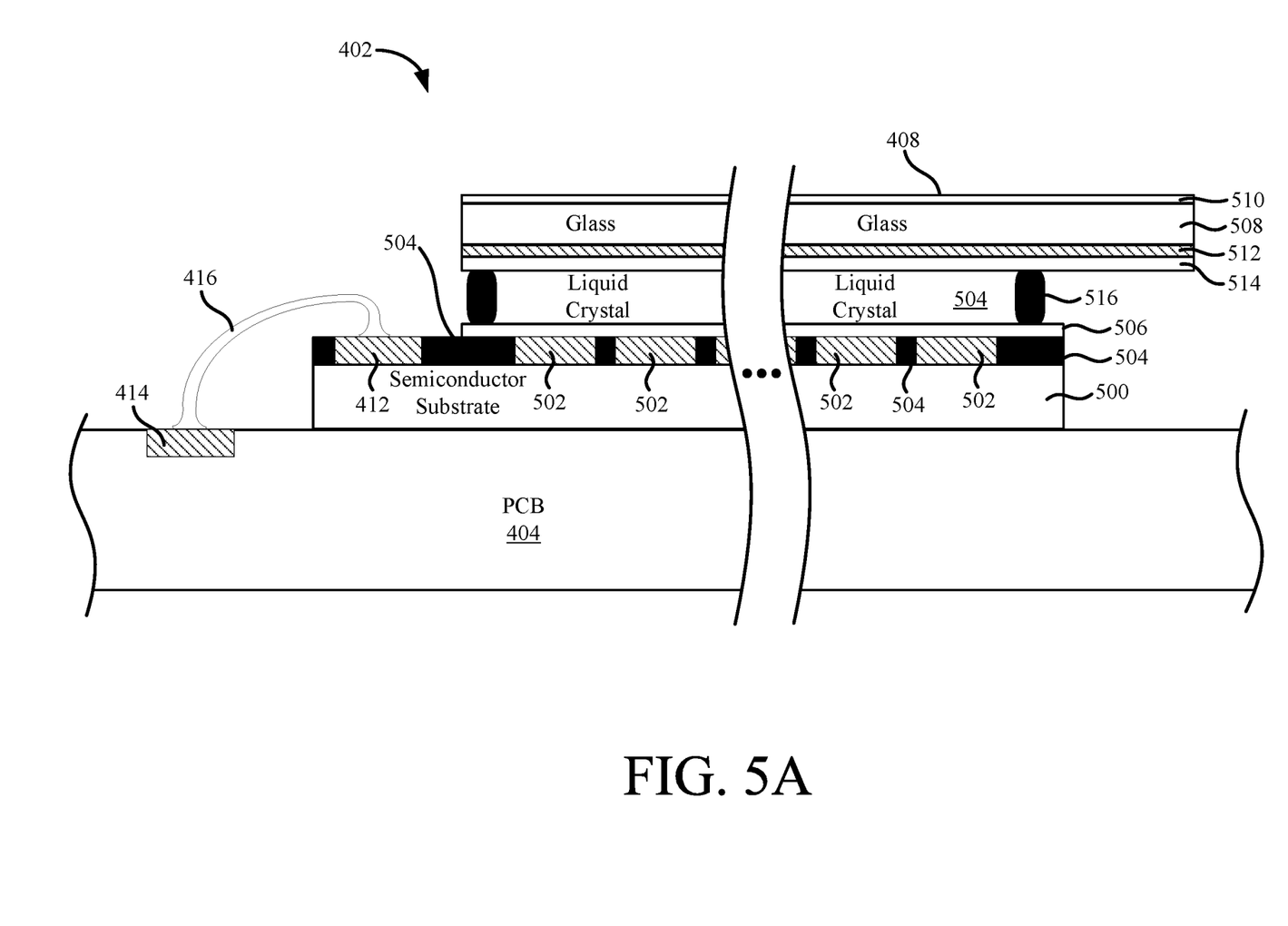
FIG. 5A shows a cross sectional view of the LCOS device of FIG. 4, taken along line A-A of FIG. 4.

FIG. 5A is a cross-sectional view of display assembly 402 and PCB 404 taken along line A-A of FIG. 4. Display assembly 402 includes a circuit substrate 500, an array of pixel mirrors 502, a light absorbing layer 504, a first alignment layer 506, a cover glass 508, an anti-reflective (AR) layer 510, a transparent electrode 512, a second alignment layer 514, a gasket 516, and a liquid crystal layer 518.

Circuit substrate 500 is, for example, a complementary metal-oxide-semiconductor (CMOS) silicon chip having image processing and control circuitry (not shown) for driving display assembly 402.

Pixel mirrors 502 are highly reflective and conductive aluminum elements formed over the circuitry of circuit substrate 500. In the example embodiment, bond pads 412 and pixel mirrors 502 are formed from the same layer of aluminum. That is, a layer of aluminum is deposited directly on circuit substrate 500 and then etched leaving behind an array of pixel mirrors 502 and bond pads 412. The etching forms physical gaps between each individual one of pixel mirrors 502, thereby electrically isolating them from one another. Likewise, bond pads 412 are separated by physical gaps formed therebetween such that they are also electrically isolated from one another. Pixel mirrors 502 and bond pads 412 are coupled to underlying circuitry by metal vias formed through the layer upon which pixel mirrors 502 and bond pads 412 are formed.

Light absorbing layer 504 includes a light absorbing material disposed directly in the gaps formed between pixel mirrors 502 and bond pads 412. The inventors have found that by filling the gaps between pixel mirrors 502 and bond pads 412 with light absorbing material, the image quality of display assembly 402 is greatly improved compared to prior art LCoS displays. This is because the light that impinges on the areas between and around pixel mirrors 502 is absorbed rather than reflected at unpredictable angles as stray light.

In the example embodiment, light absorbing layer 504 is a black material having a high light absorbing efficiency of over 50%. The material is applied to circuit substrate 404 by, for example, a lithography process. Using a lithography process provides a similar level of precision in forming light absorbing layer 504 as the precision of the process used to form, for example, pixel mirrors 502. In the example device/method, light absorbing layer 504 is formed during the fabrication of the reflective display backplane (e.g., circuit substrate 500 and pixel mirrors 502) using similar wafer level processes (e.g., lithography, etching, etc.).

Light absorbing layer 504 can be formed from an organic material and/or an inorganic material. Suitable organic materials include, but are not limited to, photoresist, acrylic monomers, epoxy monomers, acrylic monomer with black dye and/or black pigment, and epoxy monomer with black dye and/or black pigment. Suitable inorganic materials include, but are not limited to, TiN and carbon.

Suitable processes for applying organic materials include, but are not limited to, spin-on or spray-on applications. By way of non-limiting example, inorganic materials can be applied by plasma vapor deposition (PVD). Patterning of light absorbing layer 504 can be accomplished using either a positive or negative photolithography process. For example, photoresist can be patterned on pixel mirrors 502 before applying the light absorbing material, and then removed after the application of the light absorbing material, thereby removing the light absorbing material from the surface of the pixel mirrors, but leaving the light absorbing material in the gaps between. As another example, the light absorbing material can be applied to completely cover the array of pixels 502, and then be etched back to expose the top surfaces of pixel mirrors 502, leaving the light absorbing material in the gaps.

Alignment layers 506 and 514 facilitate the alignment of the liquid crystal molecules of liquid crystal layer 504. Alignment layer 506 is formed over pixel mirrors 502 and light absorbing layer 504 while alignment layer 514 is formed on the bottom surface of transparent electrode 512.

In various example embodiments, a passivation layer formed over pixel mirrors 502 (not shown separately from alignment layer 506 in FIG. 5A) can be formed either above or below light absorbing layer 504 in the gaps, or omitted altogether. In the example of FIG. 5A, alignment layer 506 can be a polyimide layer formed over both pixel mirrors 502 and light absorbing material 504. As another example, an inorganic alignment layer can be formed on top of or as an integral part of a passivation layer (e.g., an oxide layer).

Anti-reflection layer 510 and transparent electrode 512 (e.g. Indium Tin Oxide) are formed on opposite surfaces of glass 508. Anti-reflection layer 510 can be, for example, an engineered optical thin film coating. Transparent electrode 512 is, for example, a layer of conductive material (e.g. Indium Tin Oxide) that is thin enough to be transparent and functions as a common electrode across liquid crystal layer 504.

Gasket 516 is disposed between layers 506 and 514 and encapsulates liquid crystal layer 504 therebetween.

Figure 5B:
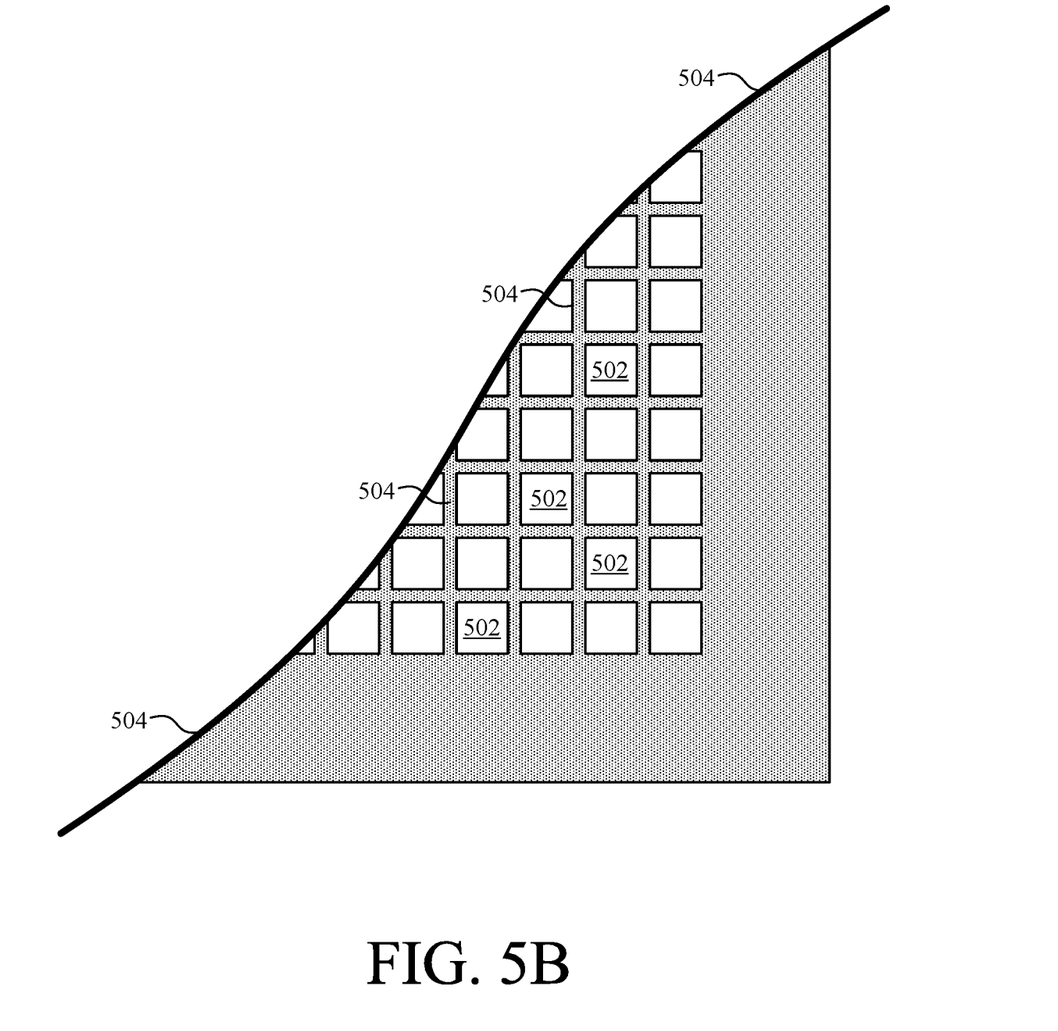
FIG. 5B is a top plan view of a portion (corner) of an array of pixels 502 of the LCOS device of FIG. 4.

FIG. 5B is a top plan view of a portion (corner) of an array of pixels 502 of the LCOS device of FIG. 4. As shown in FIG. 5B, light absorbing material 504 lies in the gaps between, but not on the surfaces of, pixel mirrors 502. Light absorbing material 504 also completely frames the array of pixels 502, covering one or more rows and columns of dummy pixels (not visible in FIG. 5B).

Figure 6A:
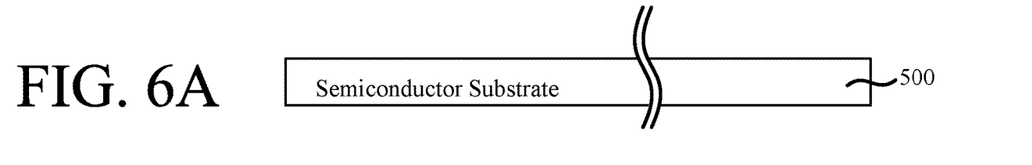
FIG. 6A illustrates a first step in an example method of manufacturing an LCOS device.
Figure 6B:
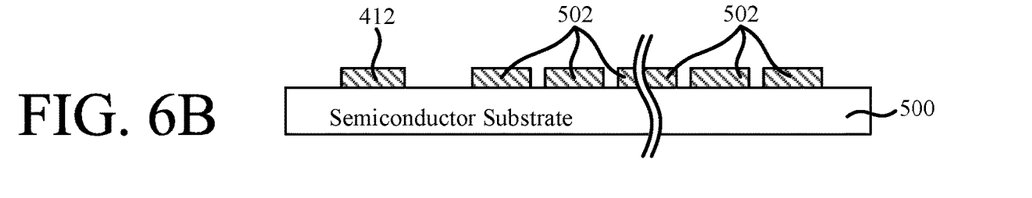
FIG. 6B illustrates another step in an example method of manufacturing the LCOS device.
Figure 6C:
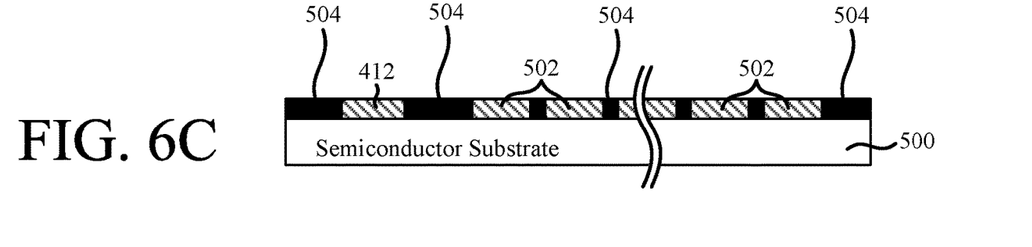
FIG. 6C illustrates another step in an example method of manufacturing the LCOS device.
Figure 6D:
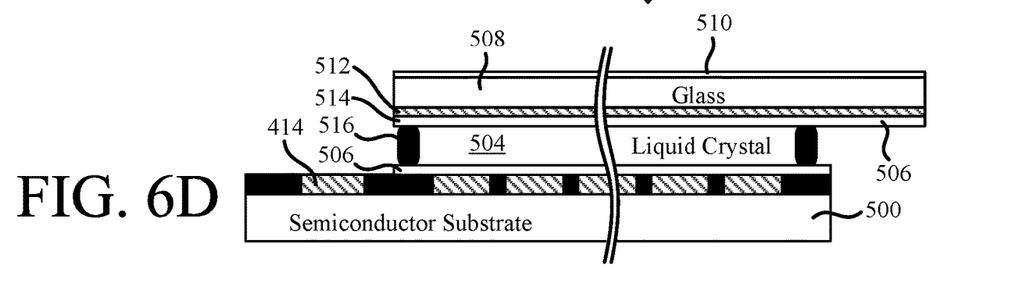
FIG. 6D illustrates another step in an example method of manufacturing the LCOS device.

FIGS. 6A-6D illustrate an example method of manufacturing display assembly 402. In FIG. 6A, circuit substrate 500 is provided. In FIG. 6B, an array of pixel mirrors 502 and a plurality of bond pads 412 are formed directly on circuit substrate 500. In FIG. 6C, light absorbing material 504 is applied between and around pixel mirrors 502. Light absorbing material 504 is also applied to the peripheral area around the array of pixels 502 including the area around bond pads 412. In a particular example, the entire top surface of the reflective display backplane, except for pixel mirrors 502 and bond pads 412, is covered with light absorbing material. FIG. 6D shows the final assembly of display assembly 402, wherein liquid crystal layer 504, glass 508, and gasket 516 are assembled together after light absorbing layer 504 is formed.

Although FIGS. 6A-6D show the manufacturing of a single display assembly 402, multiple display assemblies 402 can be formed in a similar fashion. For example, in a first step, a single wafer containing multiple connected circuit substrates 500 can be provided. Then, before the wafer is separated, multiple arrays of pixel mirrors 502 can be formed on the wafer. With the wafer still not separated, one single light absorbing layer can be formed thereon, filling all the non-reflective gaps of the wafer. Subsequently, the wafer can be separated into a plurality of individual display assemblies 402.

Figure 7:
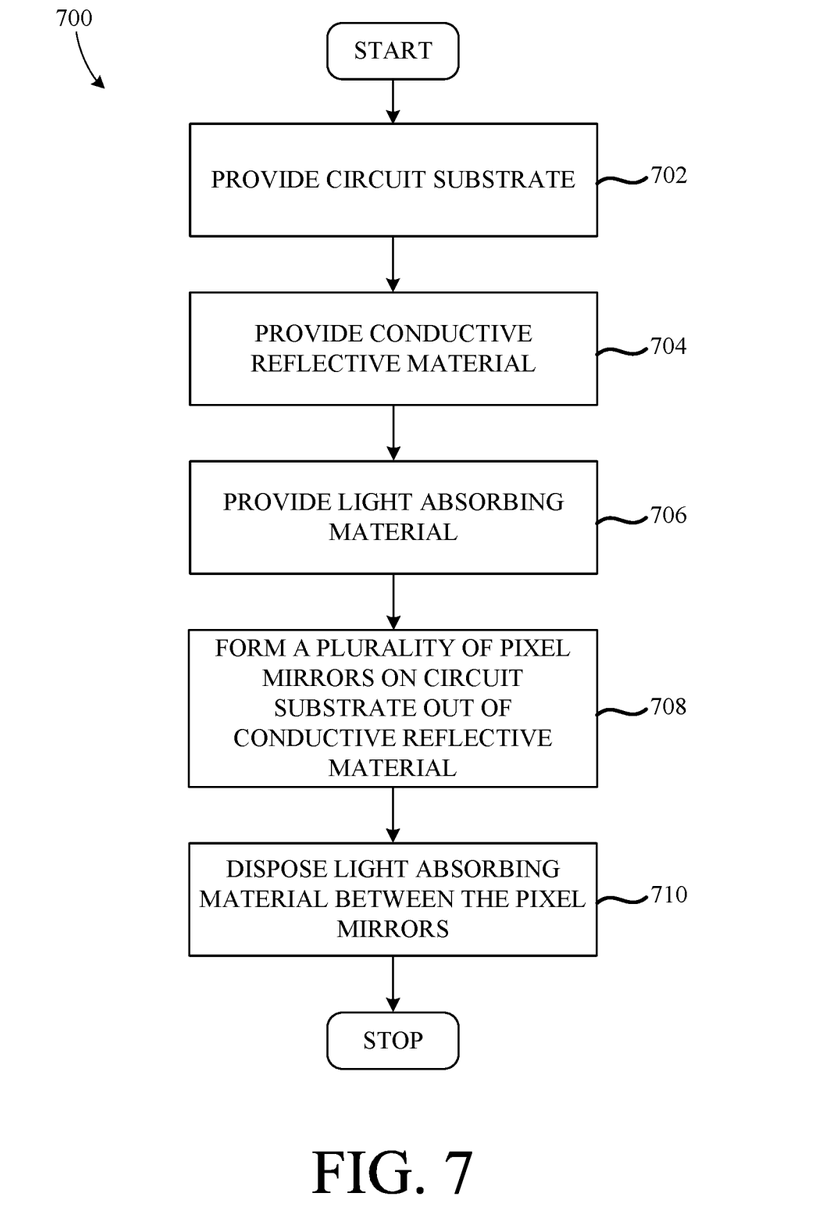
FIG. 7 is flow chart summarizing an example method of manufacturing an LCOS device.

FIG. 7 is a flowchart summarizing a method 700 of manufacturing a liquid crystal display device. In a first step 702, a circuit substrate is provided. Then, in a second step 704, a conductive and reflective material is provided. Next, in a third step 706, a light absorbing material is provided. Then, in a fourth step 708, a plurality of pixel mirrors are formed on the circuit substrate with the conductive reflective material. Finally, in a fifth step 710, the light absorbing material is disposed between and/or around the pixel mirrors.

The description of particular embodiments of the present invention is now complete. Many of the described features may be substituted, altered or omitted without departing from the scope of the invention. For example, alternate light absorbing/blocking materials may be substituted for the specific materials listed. As another example, alternative semiconductor manufacturing processes can be used to form the light blocking layer described herein. These and other deviations from the particular embodiments shown will be apparent to those skilled in the art, particularly in view of the foregoing disclosure.

We claim:
1. A liquid crystal display device comprising:
a circuit substrate;
an array of individual conductive mirrors formed on said substrate, each of said individual conductive mirrors forming a part of a respective individual pixel of said liquid crystal display device wherein each of said individual conductive mirrors being configured to be driven independently;
a light absorbing material disposed between said conductive mirrors;
a transparent plate disposed over said array of conductive mirrors; and
liquid crystal material disposed between said conductive mirrors and said transparent plate; and wherein
said light absorbing material is formed directly on a surface of said circuit substrate;
said conductive mirrors are formed directly on said surface of said circuit substrate;
said light absorbing material and said array of said conductive mirrors each have a lowermost surface and an uppermost surface, said uppermost surfaces being further away from said surface of said circuit substrate than said lowermost surfaces; and
said uppermost surface of said light absorbing material and said uppermost surfaces of said conductive mirrors are coplanar.

2. The liquid crystal display device of claim 1, wherein said light absorbing material is disposed around the peripheral region of said array of said individual conductive mirrors.

3. The liquid crystal display device of claim 1, wherein said light absorbing material is black.

4. The liquid crystal display device of claim 1, wherein said light absorbing material has a light absorbing efficiency of at least fifty percent.

5. The liquid crystal display device of claim 1, wherein said light absorbing material is formed on said circuit substrate by a lithographic process.

6. The liquid crystal display device of claim 1, further comprising a plurality of wire bond pads formed on said circuit substrate, said plurality of wire bond pads and said array of said individual conductive mirrors being coplanar and formed from the same material.

7. The liquid crystal display device of claim 1, wherein said liquid crystal display device is a Liquid Crystal on Silicon (LCOS) device.

8. The liquid crystal display device of claim 1, further comprising a first liquid crystal alignment layer formed over said array of individual conductive mirrors and over said light absorbing material.

9. The liquid crystal display device of claim 1, further comprising:
a plurality of electrical bond pads; and wherein
said light absorbing material covers the entire top surface of said circuit substrate, except for top surfaces of said individual pixel mirrors and said electrical bond pads.

10. The liquid crystal display device of claim 1, wherein said circuit substrate is a metal-oxide-semiconductor (MOS) circuit substrate.

11. The liquid crystal display device of claim 10, wherein said circuit substrate is a complementary metal-oxide-semiconductor (CMOS) circuit substrate.

12. The liquid crystal display device of claim 1, wherein:
said array of individual conductive mirrors includes a first conductive mirror and a second conductive mirror, said second conductive mirror disposed next to said first conductive mirror with no other conductive mirrors disposed therebetween;
said first conductive mirror includes a side surface extending from said uppermost surface of said first conductive mirror toward said circuit substrate;
said second conductive mirror includes a side surface extending from said uppermost surface of said second conductive mirror toward said circuit substrate; and
a first portion of said light absorbing material is disposed between said side surface of said first conductive mirror and said side surface of said second conductive mirror.

13. The liquid crystal display device of claim 12, wherein:
said first portion of said light absorbing material is disposed to block incident light from impinging on said side surface of said first conductive mirror and to block light from impinging on said side surface of said second conductive mirror.

14. The liquid crystal display device of claim 12, wherein:
said uppermost surface of said first conductive mirror has a first edge;
said uppermost surface of said second conductive mirror has a second edge, said first edge and said second edge defining a space between said first conductive mirror and said second conductive mirror;
said first portion of said light absorbing material is at least partially disposed between said space and said side surface of said first conductive mirror, and between said space and said side surface of said second conductive mirror.

15. The liquid crystal display device of claim 12, wherein:
said uppermost surface of said first conductive mirror has a height relative to said circuit substrate;
said first portion of said light absorbing material has a height relative to said circuit substrate; and
said height of said uppermost surface of first conductive mirror and said height of said first portion of said light absorbing material are the same.

16. The liquid crystal display device of claim 12, wherein:
said first portion of said light absorbing material has an uppermost surface; and
said uppermost surface of said first portion of said light absorbing material is coplanar with said uppermost surface of said first conductive mirror and said uppermost surface of said second conductive mirror.

17. The liquid crystal display device of claim 12, wherein:
said first conductive mirror is disposed on an edge of said array of conductive mirrors;
said first conductive mirror includes a second side surface facing outwardly with respect to said array of conductive mirrors; and
said light absorbing material includes a second portion adjacent said second side surface of said first conductive mirror.

18. The liquid crystal display device of claim 17, wherein:
said second portion of said light absorbing material has an uppermost surface; and
said uppermost surface of said second portion of said light absorbing material is coplanar with said uppermost surface of said first conductive mirror.

19. The liquid crystal display device of claim 17, wherein said second portion of said light absorbing material continuously and completely surrounds said array of individual conductive mirrors.

20. The liquid crystal display device of claim 1, wherein a respective portion of said light absorbing material is disposed between every pair of adjacent individual conductive mirrors of said array of individual conductive mirrors.

21. The liquid crystal display device of claim 1, wherein:
   said circuit substrate includes circuitry; and
   each individual mirror of said array of individual conductive mirrors is disposed at least partially above said circuitry.

22. The liquid crystal display device of claim 1, wherein said light absorbing material is disposed directly in gaps formed between said individual conductive mirrors.

* * * * *